(12) United States Patent
Thor

(10) Patent No.: US 8,676,456 B2
(45) Date of Patent: Mar. 18, 2014

(54) CONTROLLING TIP-IN BUMP PERFORMANCE IN A TRANSMISSION

(75) Inventor: Todd J. Thor, Byron, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 168 days.

(21) Appl. No.: 13/420,668

(22) Filed: Mar. 15, 2012

(65) Prior Publication Data

US 2013/0245902 A1     Sep. 19, 2013

(51) Int. Cl.
*B60W 10/02*     (2006.01)

(52) U.S. Cl.
USPC .............................................. 701/54; 701/51

(58) Field of Classification Search
USPC ............ 701/54, 51, 55; 477/155, 153, 53, 52, 477/106, 66–68
See application file for complete search history.

(56) References Cited

U.S. PATENT DOCUMENTS

| 5,188,005 A * | 2/1993 | Sankpal et al. | 477/102 |
| 7,524,255 B2 * | 4/2009 | Matthews | 475/54 |
| 2004/0152559 A1 * | 8/2004 | Bolander | 477/53 |

* cited by examiner

*Primary Examiner* — Marthe Marc-Coleman
(74) *Attorney, Agent, or Firm* — Quinn Law Group, PLLC

(57) ABSTRACT

A method of managing tip-in bump in an automatic transmission includes detecting a set of conditions indicative of an impending throttle tip-in event, including calculating a speed difference between engine speed and turbine speed, and reducing a pressure command to a designated clutch of the transmission to a threshold level. The method also include setting an upper limit on engine torque, flaring the turbine speed during the tip-in event, and using proportional-integral-derivative control logic of a controller to reduce flare to about zero in a calibrated duration, thereby allowing the clutch to dissipate engine inertia and minimize the severity of the tip-in bump. A transmission in a vehicle is operatively connected to an engine and has a torque converter with a turbine. The transmission includes a clutch and a controller configured to manage tip-in bump performance in the transmission via the above method.

19 Claims, 2 Drawing Sheets

CONTROLLING TIP-IN BUMP PERFORMANCE IN A TRANSMISSION

TECHNICAL FIELD

The present disclosure relates to a method and a system for controlling tip-in bump performance in a transmission.

BACKGROUND

An automatic transmission includes gear elements and clutches that selectively couple input and output shafts of the transmission to establish a desired output speed ratio. Clutch engagement is typically achieved via a controlled application of fluid pressure. The applied fluid pressure moves a clutch piston into engagement with a clutch pack. Shifting from one speed ratio to another is performed automatically by a transmission controller. At throttle tip-in, i.e., the period after a driver requests additional engine torque when engine speed is less than turbine speed but before the requested torque is delivered to the drive train, a perceptible pressure spike or bump may occur in transmission output torque as the engine momentarily freewheels. The difference in engine and turbine speed in a hydrodynamic torque converter at tip-in is proportional to the severity of the experienced bump. Bump severity can also vary with the particular design of the vehicle engine mounts which otherwise may help absorb or dampen some of the inertia of the engine.

SUMMARY

A method and system are disclosed herein for controlling tip-in bump performance in a transmission. Conventional approaches such as actively profiling engine torque delivered to the transmission may be replaced with the present approach, which instead uses available clutch information and proportional-integral-derivative (PID) control logic to control the tip-in bump via a clutch. Output torque is directly associated with clutch torque. Therefore, the clutch torque of a designated clutch engaged in the driveline can be decreased before throttle tip-in to absorb the force of the bump. This will cause a temporary flare to occur in turbine speed as the clutch slips, with the severity of the flare varying with the severity of the bump. The PID control logic can be used to recover the flare to about zero in a controlled manner with minimal perceptibility to a driver or passenger of the vehicle. The controlled clutch is thus effectively slipped in a closely controlled manner to dissipate clutch inertia as heat.

In particular, a method of managing tip-in bump in an automatic transmission includes detecting a set of conditions indicative of an impending tip-in event, including calculating a speed difference between engine speed and turbine speed. The method also includes reducing a pressure command to a designated clutch of the transmission to a threshold level, e.g., a critical holding capacity, when these conditions are present.

Additionally, the method includes setting an upper limit on engine torque, flaring the turbine speed during the tip-in event by allowing the clutch to slip, and using proportional-integral-derivative (PID) control logic of a controller to reduce the flare within a calibrated duration, thereby allowing the clutch to dissipate engine inertia as heat and thereby minimize the perceived severity of the tip-in bump to a driver or passenger. This may entail ramping engine torque at a first rate and clutch torque at a second rate that is less than the first rate until the flare is lowered to a calibrated range of zero.

The above features and advantages and other features and advantages of the present invention are readily apparent from the following detailed description of the best modes for carrying out the invention when taken in connection with the accompanying drawings.

DETAILED DESCRIPTION

Figure 1:
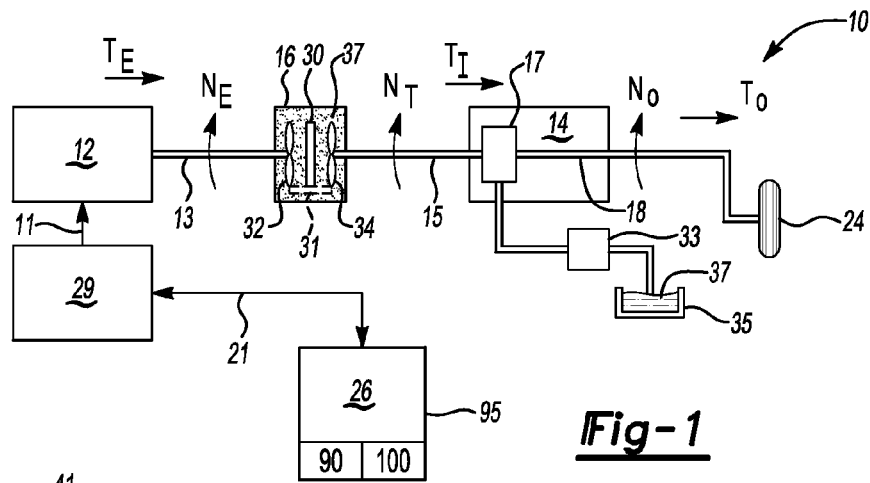
FIG. 1 is a schematic illustration of a vehicle having an automatic transmission and a controller which executes the present method controlling tip-in bump in the transmission.

Referring to the drawings, wherein like reference numbers correspond to like or similar components throughout the several figures, and beginning with FIG. 1, a vehicle 10 includes a controller 26, e.g., a transmission control unit, which selectively executes the present method 100. An example of method 100 is shown in FIG. 4 and described in detail below in conjunction with FIG. 5. Execution of the present method 100 by the controller 26 enables the controller 26 to control tip-in bump performance as noted above. Example clutches that may be designated as control clutches for execution of the present method 100 are described in detail below with reference to FIGS. 2 and 3.

The vehicle 10 of FIG. 1 includes an internal combustion engine 12. The engine 12 is coupled to an automatic transmission 14 via a hydrodynamic torque converter 16. The engine 12 delivers engine torque (arrow $T_E$) via an engine shaft 13 which rotates at engine speed (arrow $N_E$). The transmission 14 includes a transmission input shaft 15 which rotates at an input speed (arrow $N_T$). Transfer of input torque (arrow $T_I$) to the transmission 14 occurs through the torque converter 16, as is well understood in the art and as described below. At throttle tip-in, the difference in engine speed (arrow $N_E$) and turbine speed (arrow $N_T$) may result in a perceptible disturbance referred to as tip-in bump. The controller 26 therefore is configured as set forth herein to minimize the severity of the tip-in bump via clutch control according to the present method 100.

The transmission 14 of FIG. 1 also includes an output shaft 18. The output shaft 18 ultimately conveys transmission output torque (arrow $T_O$), which is transmitted via various clutch and gear sets 17 of the transmission 14, to a set of drive wheels 24. The clutch and gear sets 17 can be selectively actuated by electro-hydraulic controls (not shown) powered by fluid delivered under pressure from a fluid pump 33. The pump 33 draws fluid 37 from a sump 35.

The example transmission 14 of FIG. 1 may be configured as any multi-speed transmission. The two example transmissions provided herein for illustrative purposes are an 8-speed transmission 14 (FIG. 2) and a 6-speed transmission 114 (FIG. 3). During throttle tip-in, the particular rotating and/or braking clutches of the transmissions 14 and 114 described herein used to control tip-in bump will vary depending on speed ratio. The clutch could be any engaged clutch anywhere along the driveline.

The controller 26 may be be configured as a microprocessor-based device having such common elements as a microprocessor or CPU, and/or read only memory (ROM), random access memory (RAM), electrically-programmable read-only memory (EPROM), etc., some of which may be designated as the memory 95 noted above. The controller 26 also includes logic circuitry including but not limited to proportional-integral-derivative (PID) control logic 90, a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry.

The controller 26 uses proportional-integral-derivative (PID) control logic 90 to execute the present method 100. As is well understood in the art, PID control uses three feedback terms: a proportion (P) term, an integral (I) term, and a derivative (D) term. Each term represents the respective present, past, and future error values. The control logic responsible for generating the I term is generally referred to as an integrator. A controller using PID control logic, e.g., the present controller 26, calculates an error value in a given process variable as a difference between a measured value and a desired/calibrated value and thereafter controls process inputs as a function of the three control terms.

Still referring to FIG. 1, an engine control unit (ECU) 29 may be used either as a separate device as shown or integrated with the controller 26. If separate, the controller 26 may be in communication with the ECU 29 as indicated by double-headed arrow 21. The controller 26 may request a specific level of managed engine torque (arrow 11) from the ECU 29 as needed, and may receive any engine control values the controller 26 might require in the execution of method 100, e.g., engine speed, engine torque, and/or any other modeled engine control values.

The torque converter 16 shown in FIG. 1 has a stator 30 positioned between a pump 32 and a turbine 34. A torque converter clutch 31 may also be used to selectively lock the pump 32 to the turbine 34 above a threshold lockup speed, as will be understood by those of ordinary skill in the art. The pump 32 may be coupled to the output shaft 13 to thereby rotate at engine speed (arrow $N_E$). Within the torque converter 16, the turbine 34 is driven by fluid 37, with the turbine 34 in turn connected to the input shaft 15 of the transmission 14. Thus, rotation of the turbine 34 ultimately rotates the input shaft 15 at a turbine speed, which is the same as the input speed (arrow $N_T$) noted above. Turbine speed (arrow $N_T$) will ordinarily be than or equal to engine speed (arrow $N_E$), with viscous drag or friction losses within the transmission 14 tending to reduce the turbine speed (arrow $N_T$) to a level somewhat less than engine speed (arrow $N_E$), as will be readily understood by those of ordinary skill in the art. At certain times, however, the engine 12 will coast, and thus the engine speed (arrow $N_E$) will drop below turbine speed (arrow $N_T$). Throttle tip-in at this time can result in the tip-in bump noted above.

Figure 2:
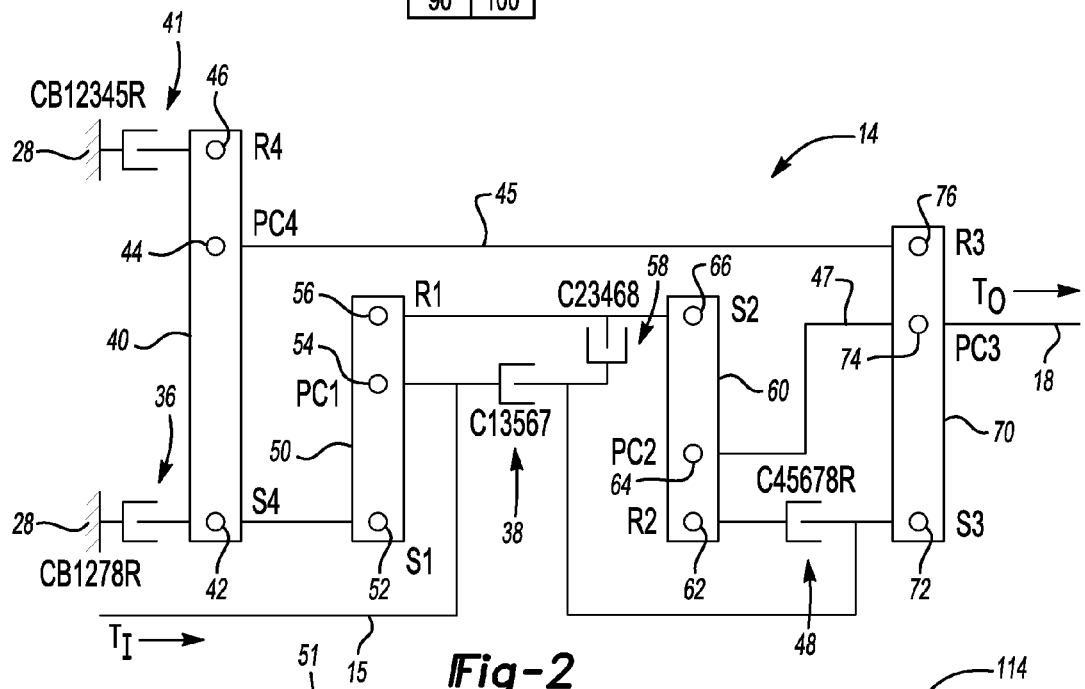
FIG. 2 is an example lever diagram for a transmission having clutches that may be designated as control clutches for execution of the present method.
Figure 3:
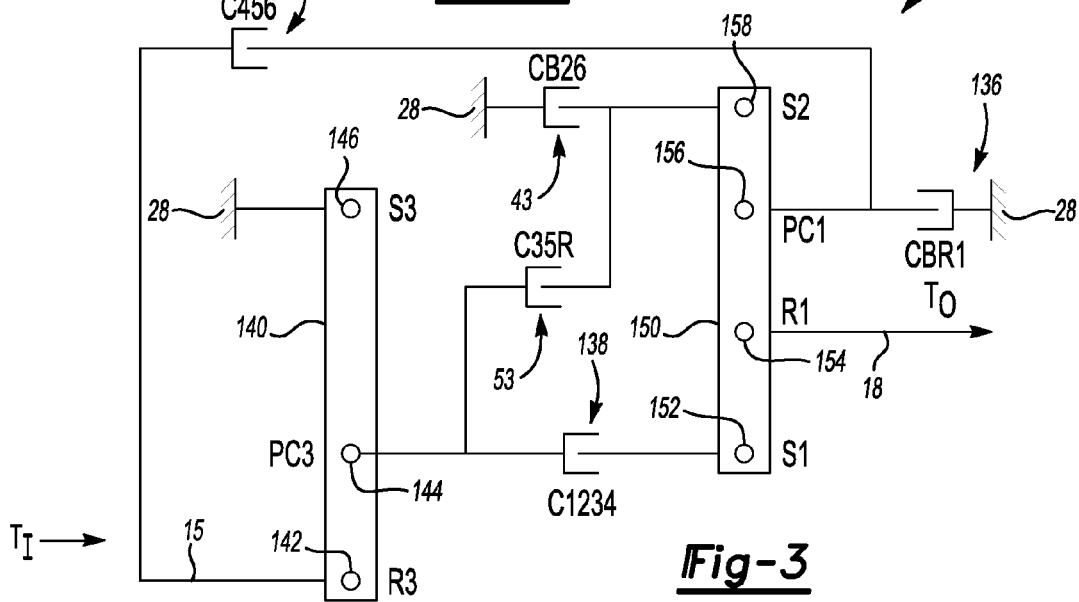
FIG. 3 is an example lever diagram for another transmission whose clutches may be designated as control clutches for execution of the present method.
Figure 4:
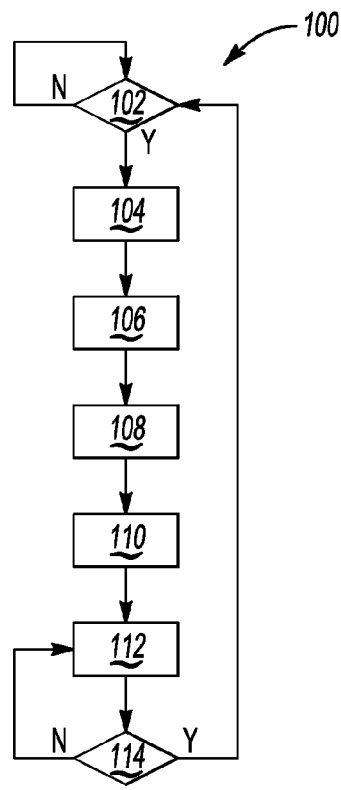
FIG. 4 is a flow chart describing an example embodiment of the present method.

FIGS. 2 and 3 illustrate two possible transmissions 14 and 114, respectively that may be controlled to minimize the severity of any tip-in bump using the present method 100. The transmission 14 of FIG. 2 is an example 8-speed transmission having four planetary gear sets 40, 50, 60, and 70. The transmission 114 of FIG. 3 is an example 6-speed transmission having two planetary gear sets 140 and 150. Other transmission configurations may be readily envisioned that could be controlled in the manner described below to control tip-in bump, and therefore the transmissions 14 and 114 are not limiting.

Referring to FIG. 2, the example transmission 14 may include a braking clutch CB1278R, i.e., clutch 36. The nomenclature CB1278R represents that this particular device is a braking clutch (CB), and is engaged in each of $1^{st}$, $2^{nd}$, $7^{th}$, $8^{th}$, and reverse (R) gears. The transmission 14 also includes another braking clutch CB12345R, or clutch 41, which selectively connects an element of a first gear set 40 to a stationary member 28 when engaged. Clutches 36 and 41 are connected to respective nodes 42 and 46 of first gear set 40. In one embodiment, node 42 can be a sun gear (S4) of the gear set 40, while node 46 may be a ring gear (R4) of the same gear set. Gear set 40 also includes a node 44, which may be a carrier member (PC4) in the embodiment shown.

Node 42 is also connected to a node 52 of a second gear set 50. Node 54 of gear set 50 is connected to an input side of a rotating clutch C13567, i.e., clutch 38, as is the transmission input shaft 15 with input torque (arrow $T_I$). Node 56 is connected to a third gear set 60 as explained below. In one embodiment, gear set 50 may be a planetary gear set wherein nodes 52, 54, and 56 are a sun gear (S1), a carrier member (PC1), and a ring gear (R1), respectively.

The third gear set 60 includes nodes 62, 64, and 66, which in one embodiment may be ring gear (R2), carrier member (PC2), and sun gear (S2), respectively. A rotating clutch C23468, i.e., clutch 58, may be connected between the output of clutch 38 and node 66, and between node 56 of gear set 50 and node 66 of gear set 60. Node 62 may be connected to a fourth gear set 70 having nodes 72, 74, and 76. Nodes 72, 74, and 76 may be a sun gear (S3), carrier member (PC3) and ring gear (R3), respectively. In particular, node 62 may be connected to node 72 via a rotating clutch C45678R, i.e., clutch 48. Node 64 of gear set 60 may be directly connected to node 74 of gear set 70, which in turn may be connected to the transmission output shaft 18 (also see FIG. 1). Nodes 44 and 76 may be continuously connected via an interconnecting member 45. Nodes 64 and 74 may be continuously connected via an interconnecting member 47. The particular clutch controlled during throttle tip-in according to the present method 100 of FIG. 4 in the 8-speed transmission 14 will vary with the start and end states or speed ratios as noted above. However, in general if the clutch is engaged during a particular gear, that clutch may be controlled as set forth hereinbelow.

Referring to FIG. 3, the transmission 14 of FIG. 1 may be embodied as a 6-speed transmission 114. In this embodiment, the transmission input shaft 15 may be connected to a first gear set 140 having nodes 142, 144, and 146, which may be embodied as a ring gear (R3), carrier member (PC3), and sun gear (S3) as shown. The input shaft 15 may be directly connected to node 142, and to a clutch C456, i.e., clutch 51. Node 144 is connected to a clutch C1234, i.e., the clutch 138, and to an input side of a rotating clutch C35R, i.e., clutch 53. Node 146 is grounded to the stationary member 28.

A second gear set 150 includes nodes 152, 154, 156, and 158, which may be embodied as a sun gear (S1), ring gear (R1), carrier gear (PC1), and another sun gear (S2), respectively. Node 158 may be connected to the stationary member 28 via a braking clutch CB26, i.e., clutch 43. Node 154 is directly connected to the transmission output shaft 18. Node 156 is connected to a braking clutch CBR1, i.e., clutch 136, which is also connected to a stationary member 28. As with the 8-speed transmission 14 of FIG. 2, the particular clutch of the 6-speed transmission 114 controlled by the controller 26 in execution of the present method 100 will vary with the start and end states/speed ratios as noted above.

Figure 5:
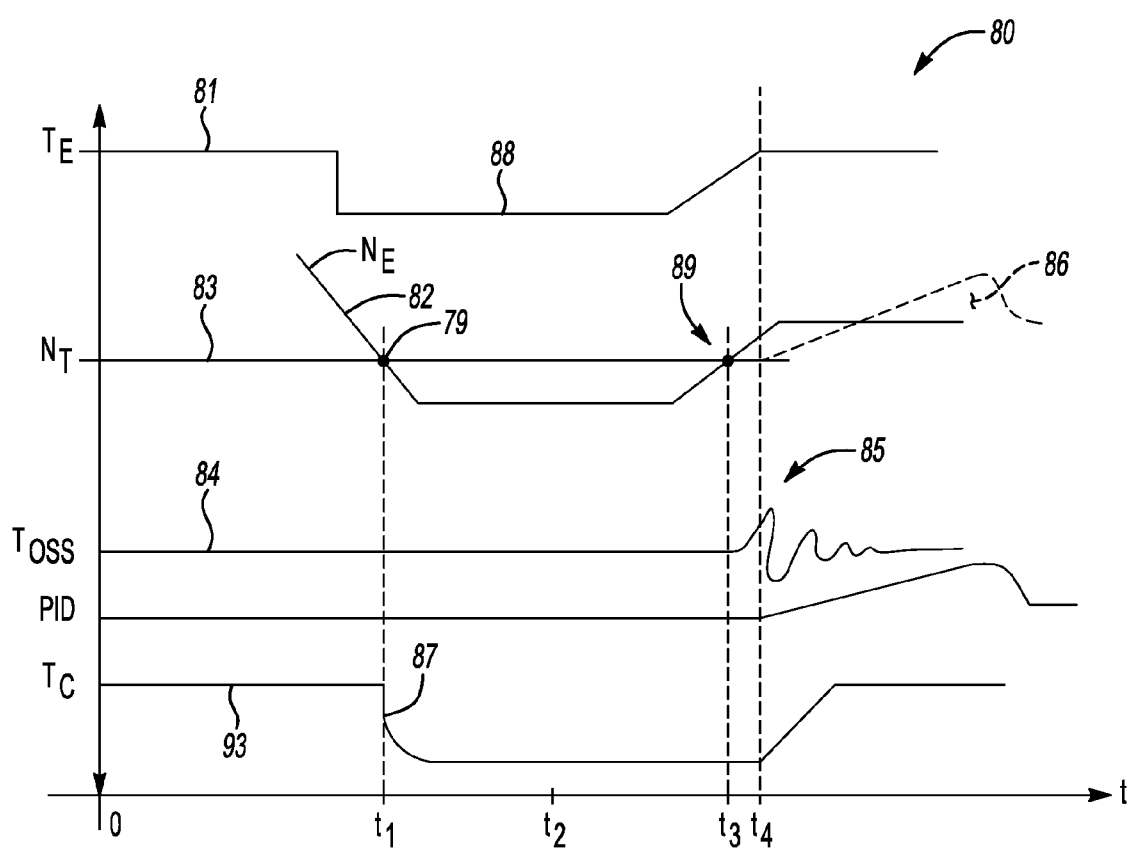
FIG. 5 is a set of traces describing various clutch control values used during execution of the present method.

Referring to FIG. 4 in conjunction with the shift control time traces 80 FIG. 5, an example embodiment of the present method 100 commences at step 102. In FIG. 5, time is plotted on the horizontal axis and amplitude is plotted on the vertical axis. In step 102, the controller 26 of FIG. 1 determines whether a throttle tip-in event may be imminent. This step may entail measuring engine speed ($N_E$), i.e., trace 82 of FIG. 5, and turbine speed ($N_T$), i.e., trace 83, comparing the two measured values, and then determining when and to what extent engine speed lags turbine speed and the rate at which the decreasing engine speed (trace 82) is approaching turbine speed (trace 83). Step 102 is repeated until conditions are present that are indicative of conditions prior to throttle tip-in.

At step 104, at about point 79 which occurs at about $t_1$, the decreasing engine speed (trace 82) crosses turbine speed (trace 83). Clutch torque (trace 93) is reduced according to a calibrated profile, which is represented in FIG. 5 as trace 87. That is, the controller 26 of FIG. 1 reduces the clutch torque (trace 93 of FIG. 5) of a designated clutch to a calibrated pressure, for instance at or just above critical holding pressure for that clutch. This value may be determined from a previously-learned clutch torque/pressure relationship for that clutch, and thus is a calibrated value. Trace 93 is also labeled $T_C$ in FIG. 5, i.e., "clutch torque", for added clarity.

At step 106, the controller 26 of FIG. 1 may activate PID logic 90 so that the PID logic 90 is ready to manage any flare in turbine speed (trace 83) that might result from the present control action, as set forth below. At this point, which occurs at about $t_2$ in FIG. 5, the engine 12 of FIG. 1 is coasting or imparting negative torque.

At step 108, the controller 26 may set/record an upper torque threshold for the engine torque (trace 81) based on the difference in speed, i.e., ($N_T$–$N_E$). For instance, if the difference is 200 RPM, 40 Nm of torque may be required if engine inertia is about 0.03 Nm/s/s, which may allow the engine speed to cross the turbine speed, i.e., point 89, in about 150 msec. Engine torque may drop to the level of trace 88, which may be zero in one embodiment, before $t_1$ until shortly before $t_3$ as shown.

At step 110, the controller 26 of FIG. 1 may begin to slip the designated clutch. Just before $t_3$, as engine speed (trace 82) begins to ramp up, engine torque (trace 81) steps up and is held until $t_4$. Turbine speed (trace 83) will begin to flare at or just after about $t_3$, as indicated by trace 86. As output torque from the transmission 14 is directly associated with clutch torque, step 110 effectively includes dissipating engine inertia during throttle tip-in as heat to thereby lessen the severity of the tip-in bump. Such a bump may be detected by a transmission output speed sensor (TOSS), with the signal from such a TOSS represented in FIG. 5 as trace 84, and with the bump and subsequent decay thereof indicated by arrow 85. The amount of slip to be introduced by the controller 26 can vary, for instance proportionally to the speed difference between engine speed ($N_E$) and turbine speed ($N_T$).

At step 112, the controller 26 of FIG. 1 uses the active PID control logic 90 of FIG. 1 after $t_4$ to manage the turbine flare (trace 86), and to smoothly reduce the flare (trace 86) to within a calibrated range of zero, e.g., ±5 RPM, without an additional inertia bump. This may occur by ramping the engine torque (trace 81) after $t_4$ at a lesser rate than the ramp rate of the clutch torque (trace 93) after the same point over a calibrated period, e.g., about 200-400 msec.

At step 114, the controller 26 determines whether flare (trace 86) is back under control, which is defined herein as being within the calibrated range noted above with respect to step 112. If so, the method 100 returns to step 102 and begins anew. If flare (trace 86) is still not under control, step 112 may be repeated until the PID control logic 90 has reduced flare (trace 86) to the target level.

While the best modes for carrying out the invention have been described in detail, those familiar with the art to which this invention relates will recognize various alternative designs and embodiments for practicing the invention within the scope of the appended claims.

The invention claimed is:

1. A method of managing tip-in bump in an automatic transmission, the method comprising:
   detecting a set of conditions indicative of an impending throttle tip-in event, including calculating a speed difference between engine speed and turbine speed;
   reducing a pressure command to a designated clutch of the transmission to a threshold level;
   setting an upper limit on engine torque;
   flaring the turbine speed during the tip-in event; and
   using proportional-integral-derivative (PID) control logic of a controller to reduce flare to within a calibrated range of zero within a calibrated duration, thereby allowing the clutch to dissipate engine inertia and minimize the severity of the tip-in bump.

2. The method of claim 1, wherein the calibrated range of zero is +/−5 revolutions per minute.

3. The method of claim 1, wherein using the PID control logic of a controller to reduce flare includes ramping engine torque at a first rate and clutch torque at a second rate that is greater than the first rate until the flare is about zero.

4. The method of claim 1, wherein detecting the set of conditions includes determining whether the engine speed is less than the turbine speed.

5. The method of claim 1, wherein setting an upper limit on engine torque is performed as a function of the speed difference between engine speed and turbine speed.

6. The method of claim 1, wherein flaring the turbine speed includes allowing the clutch to slip while the clutch torque is held at the threshold level.

7. A transmission operatively connected to an engine, the transmission having a torque converter with a turbine, the transmission comprising:
   a clutch; and
   a controller in communication with the clutch, and configured to manage tip-in bump performance in the transmission, wherein the controller includes proportional-integral-derivative (PID) control logic, and is configured to:
   detect a set of conditions indicative of an impending throttle tip-in event by calculating a speed difference between engine speed and turbine speed;
   reduce a pressure command to a designated clutch of the transmission to a threshold level;
   set an upper limit on engine torque;
   flare the turbine speed during the tip-in event; and
   use the PID control logic to reduce flare to about zero in a calibrated duration, thereby allowing the clutch to dissipate engine inertia and minimize the severity of the tip-in bump.

8. The transmission of claim 7, wherein the controller is configured to ramp engine torque at a first rate and clutch torque at a second rate that is greater than the first rate until the flare is within a calibrated range of zero.

9. The transmission of claim 7, wherein the controller is configured to add additional clutch torque after the flare is about zero at a third rate that is equal to or greater than the second rate.

10. The transmission of claim 7, wherein the controller detects the set of conditions in part by determining whether the engine speed is less than the turbine speed.

11. The transmission of claim 7, wherein the controller is configured to set the upper limit on engine torque as a function of the speed difference.

12. The transmission of claim 7, wherein the controller flares the turbine speed by allowing the clutch to slip while the clutch torque is held at the threshold level.

13. The transmission of claim 7, wherein the transmission is one of a 6-speed transmission and an 8-speed transmission.

14. A vehicle comprising:
an engine having an output shaft;
a transmission having an input shaft and a clutch;
a torque converter that couples the output shaft to the input shaft, wherein the torque converter includes a turbine connected to the input shaft; and
a controller in communication with the clutch, wherein the controller includes proportional-integral-derivative (PID) control logic and is configured to:
detect a set of conditions indicative of an impending throttle tip-in event by calculating a speed difference between a speed of the engine and a speed of the turbine;
reduce a pressure command to a designated clutch of the transmission to a threshold level;
set an upper limit on engine torque;
flare the turbine speed during the tip-in event; and
use the PID control logic to reduce flare to within a threshold range of zero within a calibrated duration, thereby allowing the clutch to dissipate engine inertia and minimize the severity of the tip-in bump.

15. The vehicle of claim 14, wherein the controller is configured to ramp engine torque at a first rate and clutch torque at a second rate that is greater than the first rate until the flare is about zero.

16. The vehicle of claim 14, wherein the controller is configured to add additional clutch torque after the flare is about zero at a third rate that is equal to or greater than the second rate.

17. The vehicle of claim 14, wherein the controller detects the set of conditions in part by determining whether the engine speed is less than the turbine speed.

18. The vehicle of claim 14, wherein the controller flares the turbine speed by allowing the clutch to slip while the clutch torque is held at the threshold level.

19. The vehicle of claim 14, wherein the transmission is one of a 6-speed transmission and an 8-speed transmission.

* * * * *